United States Patent
Khessib et al.

(10) Patent No.: US 10,168,756 B2
(45) Date of Patent: Jan. 1, 2019

(54) BACKUP POWER MANAGEMENT FOR COMPUTING SYSTEMS

(71) Applicant: Microsoft Technology Licensing, LLC, Redmond, WA (US)

(72) Inventors: Badriddine Khessib, Redmond, WA (US); Bryan Kelly, Redmond, WA (US); Mark Santaniello, Redmond, WA (US); Chris Ong, Bellevue, WA (US); John Siegler, Carnation, WA (US); Sriram Govindan, Redmond, WA (US); Shaun Harris, College Station, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/274,884

(22) Filed: Sep. 23, 2016

(65) Prior Publication Data
US 2017/0010644 A1 Jan. 12, 2017

Related U.S. Application Data

(63) Continuation of application No. 14/177,502, filed on Feb. 11, 2014, now Pat. No. 9,483,094.

(51) Int. Cl.
G06F 11/00 (2006.01)
G06F 1/26 (2006.01)
(Continued)

(52) U.S. Cl.
CPC ........... *G06F 1/263* (2013.01); *G06F 1/30* (2013.01); *G06F 1/3203* (2013.01); *G06F 1/324* (2013.01);
(Continued)

(58) Field of Classification Search
CPC ... G06F 1/26; G06F 1/263; G06F 1/28; G06F 1/30; G06F 1/3203; G06F 1/3206;
(Continued)

(56) References Cited

U.S. PATENT DOCUMENTS 7,203,849 B2 4/2007 Dove
7,793,120 B2 9/2010 McGrane et al.
(Continued)

OTHER PUBLICATIONS

"Final Office Action Issued in U.S. Appl. No. 14/177,502", dated Apr. 28, 2016, 22 Pages.
(Continued)

*Primary Examiner* — Marc Duncan
(74) *Attorney, Agent, or Firm* — Liang IP, PLLC

(57) ABSTRACT

Various techniques for managing power backup for computing devices are disclosed herein. In one embodiment, a method includes receiving data representing a backup capacity of one or more backup power units and data representing a backup power profile of one or more processing units sharing the one or more backup power units. A portion of the backup capacity may then be assigned to each of the one or more processing units based at least in part on both the received data representing the backup capacity of the one or more backup power units and the received data representing the profile of the one or more processing units.

20 Claims, 5 Drawing Sheets

(51) Int. Cl.
*G06F 1/30* (2006.01)
*G06F 1/32* (2006.01)
*G06F 9/4401* (2018.01)
*G06F 12/0804* (2016.01)

(52) U.S. Cl.
CPC ............ *G06F 1/3228* (2013.01); *G06F 9/442* (2013.01); *G06F 12/0804* (2013.01); *G06F 2212/60* (2013.01)

(58) Field of Classification Search
CPC ...... G06F 1/3212; G06F 1/324; G06F 1/3246; G06F 1/3275; G06F 1/3287
See application file for complete search history.

(56) References Cited

U.S. PATENT DOCUMENTS

| | | |
|---|---|---|
| 8,006,112 B2 | 8/2011 | Munjal et al. |
| 8,258,754 B2 | 9/2012 | Chen et al. |
| 8,499,184 B2 | 7/2013 | Hutchison et al. |
| 8,595,515 B1 | 11/2013 | Weber et al. |
| 8,751,849 B2* | 6/2014 | Conroy ............... G06F 1/26 713/340 |
| 8,782,450 B2 | 7/2014 | Cepulis et al. |
| 9,201,486 B2 | 12/2015 | Jagadishprasad et al. |
| 9,256,263 B1 | 2/2016 | Narayanan et al. |
| 2005/0138438 A1 | 6/2005 | Bodas |
| 2005/0229037 A1 | 10/2005 | Egan et al. |
| 2006/0230299 A1 | 10/2006 | Zaretsky et al. |
| 2007/0067657 A1 | 3/2007 | Ranganathan et al. |
| 2007/0260897 A1 | 11/2007 | Cochran et al. |
| 2008/0301475 A1 | 12/2008 | Felter et al. |
| 2009/0070611 A1 | 3/2009 | Bower et al. |
| 2010/0211810 A1 | 8/2010 | Zacho |
| 2011/0145606 A1 | 6/2011 | Diab et al. |
| 2012/0054520 A1 | 3/2012 | Ben-Tsion |
| 2012/0137289 A1* | 5/2012 | Nolterieke .......... G06F 9/45558 718/1 |
| 2012/0192007 A1 | 7/2012 | Weilnau et al. |
| 2012/0221878 A1 | 8/2012 | Pocklington et al. |
| 2012/0226922 A1 | 9/2012 | Wang et al. |
| 2012/0290865 A1 | 11/2012 | Kansal et al. |
| 2012/0331317 A1 | 12/2012 | Rogers et al. |
| 2013/0007515 A1 | 1/2013 | Shaw et al. |
| 2016/0070328 A1 | 3/2016 | Berke et al. |

OTHER PUBLICATIONS

"Non-Final Office Action Issued in U.S. Appl. No. 14/177,502", dated Nov. 24, 2015, 26 Pages.

"Notice of Allowance Issued in U.S. Appl. No. 14/177,502", dated Jul. 6, 2016, 6 Pages.

Wang, et al., "Virtualizing Power Distribution in Datacenters", In Proceedings of the 40th Annual International Symposium on Computer Architecture, Jun. 23, 2013, 12 pages.

Murray, Robert, "Power Management in the Cisco Unified Computing System: An Integrated Approach", In White Paper of CISCO, Apr. 20, 2013, 13 pages.

Nathuji, et al., "VirtualPower: Coordinated Power Management in Virtualized Enterprise Systems", In Proceedings of 21st ACM SIGOPS Symposium on Operating Systems Principles, Oct. 14, 2007, 14 pages.

Kontorinisy, et al., "Managing Distributed UPS Energy for Effective Power Capping in Data Centers", In Proceedings of 39th Annual International Symposium on Computer Architecture, Jun. 9, 2012, 12 pages.

Kuppuswamy, Barath, "Priority Based Power Management and Reduced Downtime in Data Centers", In Theses of Graduate Research, Jan. 1, 2009, 49 pages.

Cao, et al., "Virtual Battery: An Energy Reserve Abstraction for Embedded Sensor Networks", In Proceedings of the Real-Time Systems Symposium, Nov. 30, 2008, 11 pages.

"Second Written Opinion Issued in PCT Application No. PCT/US2015/014529", dated Jan. 11, 2016, 7 Pages.

"International Search Report and Written Opinion Issued in PCT Application No. PCT/US2015/014529", dated Apr. 24, 2015, 11 Pages.

"International Preliminary Report on Patentability Issued in PCT Application No. PCT/US2015/014529", dated Apr. 12, 2016, 8 Pages.

* cited by examiner

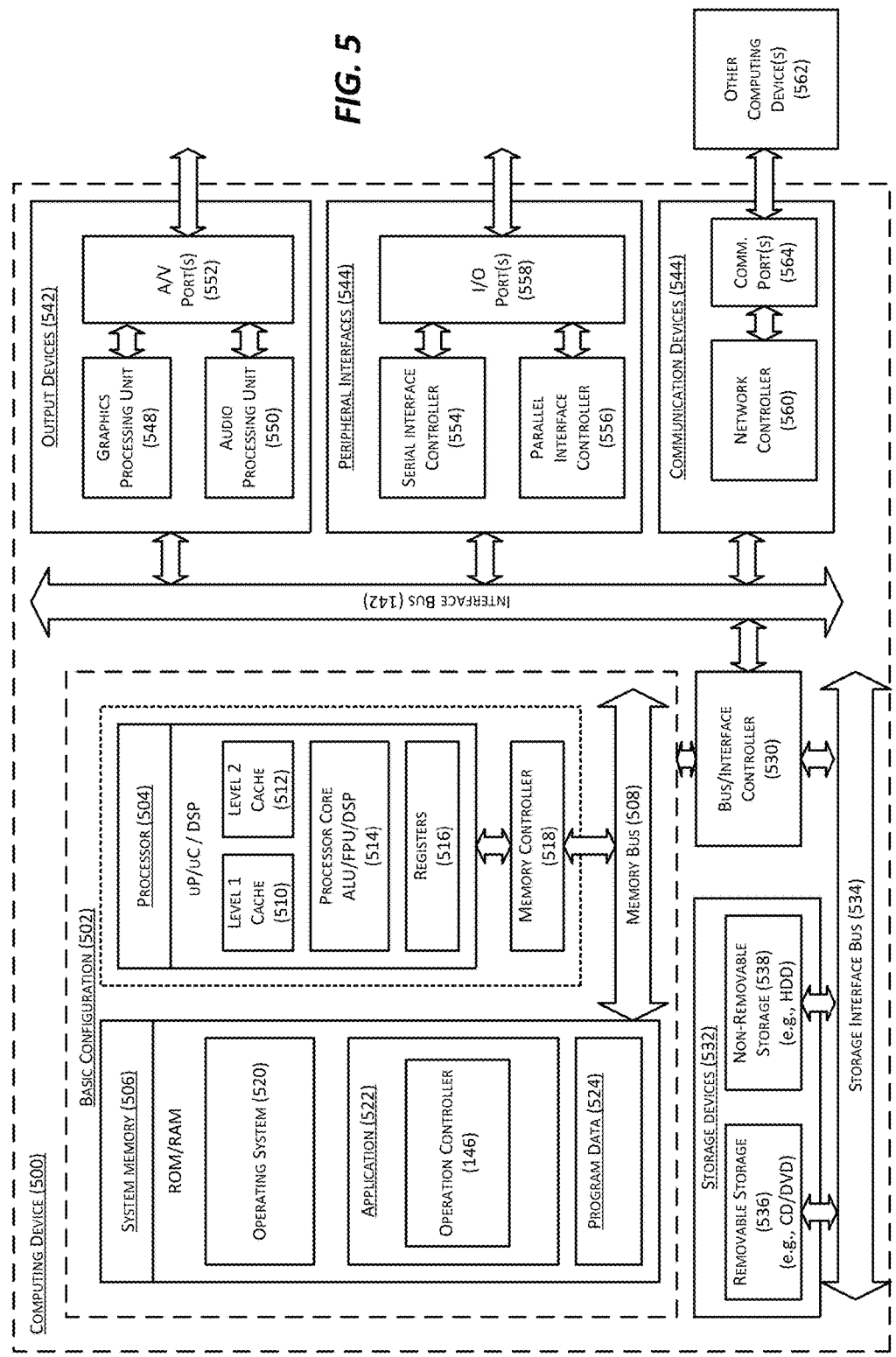

BACKUP POWER MANAGEMENT FOR COMPUTING SYSTEMS

CROSS-REFERENCE TO RELATED APPLICATION(S)

This application is a continuation of and claims priority to U.S. patent application Ser. No. 14/177,502, filed on Feb. 11, 2014, the disclosure of which is incorporated herein in its entirety.

BACKGROUND

Modern computing systems can include multiple servers, input/output units, routers, switches, and other processing units supported by a utility infrastructure. The utility infrastructure can include transformers, rectifiers, voltage regulators, circuit breakers, substations, power distribution units, fans, cooling towers, and/or other electrical/mechanical components. For system reliability, the utility infrastructure can also include uninterrupted power supplies, batteries, generators, auxiliary electrical lines, and/or other backup power units.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing systems, multiple servers, input/output units, routers, switches, and/or other types of processing units may share a backup power system having a pool of uninterrupted power supplies, batteries, generators, auxiliary electrical lines, and/or other backup power units. The backup power system is typically configured to simultaneously power all of the processing units during a power failure and/or in response to some other system events. Thus, the multiple processing units do not have a direct connection with or an awareness of a particular one or more of the backup power units. As a result, the processing units may not be configured to perform task prioritization, processor speed modifications, power cycling, and/or other operational customizations based on one or more characteristics and/or conditions of the shared backup power units.

Several embodiments of the present technology can address at least some of the foregoing difficulties by assigning a portion of the backup capacity of the backup power system to individual processing units. Power consumption of the individual processing units from the pool of backup power units can then be controlled based on the assigned portion of the total backup capacity. The individual processing units are each associated with a "virtual" backup power unit having the assigned portion of the total backup capacity. Based on such assignments, the individual processing units may perform various operational customizations to improve computing performance, increase power efficiencies, or lower capital investments over conventional computing systems.

BRIEF DESCRIPTION OF THE DRAWINGS

FIG. 5 is a computing device suitable for certain components of the computing framework in FIG. 1A.

DETAILED DESCRIPTION

Figure 1A:
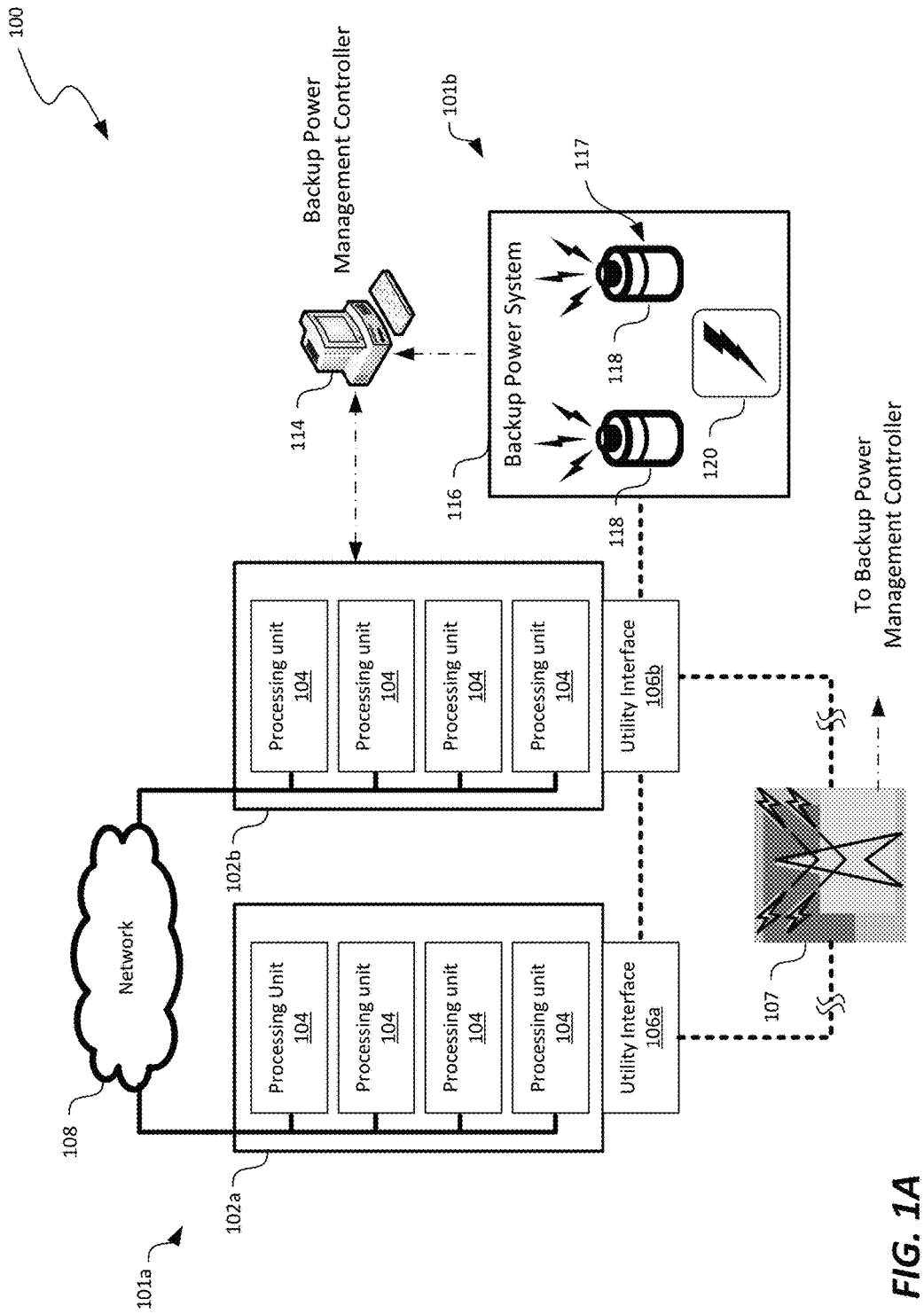
FIG. 1A is a schematic diagram illustrating a computing framework having a backup power management controller in accordance with embodiments of the present technology.

Certain embodiments of systems, devices, components, modules, routines, and processes for backup power management are described below. In the following description, example software codes, values, and other specific details are included to provide a thorough understanding of certain embodiments of the present technology. A person skilled in the relevant art will also understand that the technology may have additional embodiments. The technology may also be practiced without several of the details of the embodiments described below with reference to FIGS. 1A-5.

As used herein, the term "backup power unit" generally refers to an electrical apparatus that provides electrical power to a load when a main power source of the load is unavailable. Examples of backup power units can include batteries, uninterruptible power supplies, generators (e.g., diesel, natural gas, wave, or wind generators), and auxiliary electrical lines. A plurality of backup power units may be pooled (e.g., electrically connected in series and/or in parallel) as a backup power system. An aggregate, overall, or total backup capacity (referred to herein as "backup capacity") of the backup power system may be defined by a backup power rating (e.g., in kilowatts), a backup energy rating (e.g., in kilowatt-hours), a backup period (e.g., hours, minutes, or seconds), and/or other suitable parameters.

Also used herein, the term "processing unit" generally refers to an electronic apparatus configured to perform logic comparisons, arithmetic calculations, electronic communications, electronic input/output, and/or other functions. Examples of processing units can include computing systems (e.g., servers, computers, etc.), devices (e.g., logic processors, network routers, network switches, network interface cards, data storage devices, etc.), or other suitable types of electronic apparatus. A processing unit can have a backup power profile defined by at least one of a peak power consumption (e.g., in kilowatts), an average power consumption (e.g., in kilowatts), a backup energy requirement (e.g., in kilowatt-hours), a backup power duration (e.g., in hours, minutes, or seconds), and/or other suitable parameters.

A group of processing units may share a backup power system having a pool of various types of backup power units. Each of the processing units, however, typically does not have a direct connection with or even an awareness of one or more of the backup power units in the pool. Instead, the backup power system is configured to power all of the processing units simultaneously. As a result, the individual processing units may not be configured to perform task prioritization, processor speed modifications, power cycles, and/or other operational customizations based on one or more characteristics and/or conditions of the shared backup power units. Several embodiments of the present technology can address at least some of the foregoing difficulties by assigning a portion of the backup capacity of the pool of backup power units to the individual processing units. Thus, operational customizations of the individual processing units may be enabled, as discussed in more detail below with reference to FIGS. 1A-5.

FIG. 1A is a schematic diagram illustrating a computing framework 100 having backup power management in accordance with embodiments of the present technology. As shown in FIG. 1A, the computing framework 100 can include a computing system 101a, a utility infrastructure 101b that supports the computing system 101a, and a backup power management controller 114 in communication with both the computing system 101a and the utility infrastructure 101b. Even though certain components of the computing framework 100 are shown in FIG. 1A, in other embodiments, the computing framework 100 may also include other suitable electrical/mechanical components in similar or different arrangements, an example of which is described below with reference to FIG. 4.

As shown in FIG. 1A, the computing system 101a can include multiple processing units 104 contained in computer cabinets 102 (illustrated individually as first and second computer cabinets 102a and 102b, respectively) and coupled to a network 108. The computer cabinets 102 can have any suitable shape and size to house the processing units 104 in racks and/or in other suitable arrangements. Though only two computer cabinets 102 are shown in FIG. 1A, in other embodiments, the computing system 101a can include one, three, four, or any other suitable number of computer cabinets 102 and/or other types of housing components.

The network 108 can include a wired medium (e.g., twisted pair, coaxial, untwisted pair, or optic fiber), a wireless medium (e.g., terrestrial microwave, cellular systems, WI-FI, wireless LANs, Bluetooth, infrared, near field communication, ultra-wide band, or free space optics), or a combination of wired and wireless media. The network 108 may operate according to Ethernet, token ring, asynchronous transfer mode, and/or other suitable protocols. In further embodiments, the network 108 can also include routers, switches, modems, and/or other suitable computing/communications components in any suitable arrangements.

The processing units 104 can be configured to implement one or more computing applications, network communications, input/output capabilities, and/or other suitable functionalities. In certain embodiments, the processing units 104 can include web servers, application servers, database servers, and/or other suitable computing components. In other embodiments, the processing units can include routers, network switches, analog/digital input/output modules, modems, and/or other suitable electronic components. FIG. 1A shows four processing units 104 in each computer cabinet 102. In other embodiments, one, two, three, five, or any other suitable number of processing units 104 may be in each computing cabinet 102.

In the illustrated embodiment, the utility infrastructure 101b includes a main power source 107 (e.g., an electrical grid) configured to provide power to the processing units 104 during normal operation. The utility infrastructure 101b also includes a backup power system 116 configured to provide power to the processing units 104 when the main power source 107 is unavailable. Utility interfaces 106 (illustrated individually as first and second utility interfaces 106a and 106b, respectively) operatively couple the main power source 107 and/or the backup power system 116 to the processing units 104. The components of the utility infrastructure 101b shown in FIG. 1A are examples for illustrating aspects of the present technology. In other embodiments, the utility infrastructure 101b may include HVAC systems, substations, and/or other components in other suitable arrangements.

As shown in FIG. 1A, the first and second utility interfaces 106a and 106b are associated with the first and second computer cabinets 102a and 102b, respectively. The utility interfaces 106 can be configured to convert, condition, distribute, and/or switch power, to monitor for electrical faults, or to otherwise interface with components of the utility infrastructure 101b. For example, in one embodiment, the utility interfaces 106 can include a power distribution unit configured to receive power from the main power source 107 or the backup power system 116 and distribute power to the individual processing units 104. In other embodiments, the utility interfaces 106 can include a power conversion unit (e.g., a transformer), a power conditioning unit (e.g., a rectifier, a filter, etc.), a power switching unit (e.g., an automatic transfer switch), a power protection unit (e.g., a surge protection circuit or a circuit breaker), and/or other suitable electrical/mechanical components that support operation of the processing units 104.

The backup power system 116 can be configured to provide temporary and/or emergency backup power to the processing units 104 when the main power source 107 is unavailable. The backup power system 116 can include a pool of backup power units 117. For example, in the illustrated embodiment, the backup power system 116 includes two uninterrupted power supplies 118 and a generator 120 coupled to both the first and second utility interfaces 106a and 106b. In other embodiments, the backup power system 116 may include additional and/or different components in other suitable arrangements.

During normal operation, the utility interfaces 106 receive electrical power from the main power source 107 and convert, condition, and/or distribute power to the individual processing units 104 in respective computer cabinets 102. The utility interfaces 106 also monitor for and protect the processing units 104 from power surges, voltage fluctuation, and/or other undesirable power conditions. In response to a failure of the main power source 107, the utility interfaces 106 can switch power supply to the backup power system 116 and provide power to the individual processing units 104 in the computer cabinets 102. As a result, the processing units 104 may continue to operate for a period of time even when the main power source 107 is unavailable.

In conventional computer systems, the processing units 104 are typically not connected to or aware of the uninterrupted power supplies 118 or the generator 120 of the backup power system 116. Instead, the backup power system 116 powers all of the processing units 104 simultaneously. Thus, the individual processing units 104 may lack backup power information to customize operations when the main power source 107 is unavailable. Thus, to achieve a target level of backup operating period, a large amount of backup capacity may be required with associated costs and maintenance requirements.

In certain embodiments of the present technology, the backup power management controller 114 can be configured to assign a portion of the backup capacity of the backup power system 116 to the individual processing units 104 as if the individual processing units 104 are connected to or associated with a "virtual" backup power unit having the assigned portion of the backup capacity. In the illustrated embodiments, the backup power management controller 114 resides on a standalone computing device. In other embodiments, the backup power management controller 114 can also include one of the processing units 104 or a software service running thereon. In further embodiments, the backup power management controller 114 can also be a component of the utility interfaces 106 or a chassis controller (not shown) residing on chassis in the computer cabinets 102. By customizing operations of the processing units 104 based on corresponding assigned portions of the backup capacity, the total amount of the backup capacity in the utility infrastructure 101b may be reduced when compared to conventional techniques, as described in more detail below with reference to FIG. 1B.

Figure 1B:
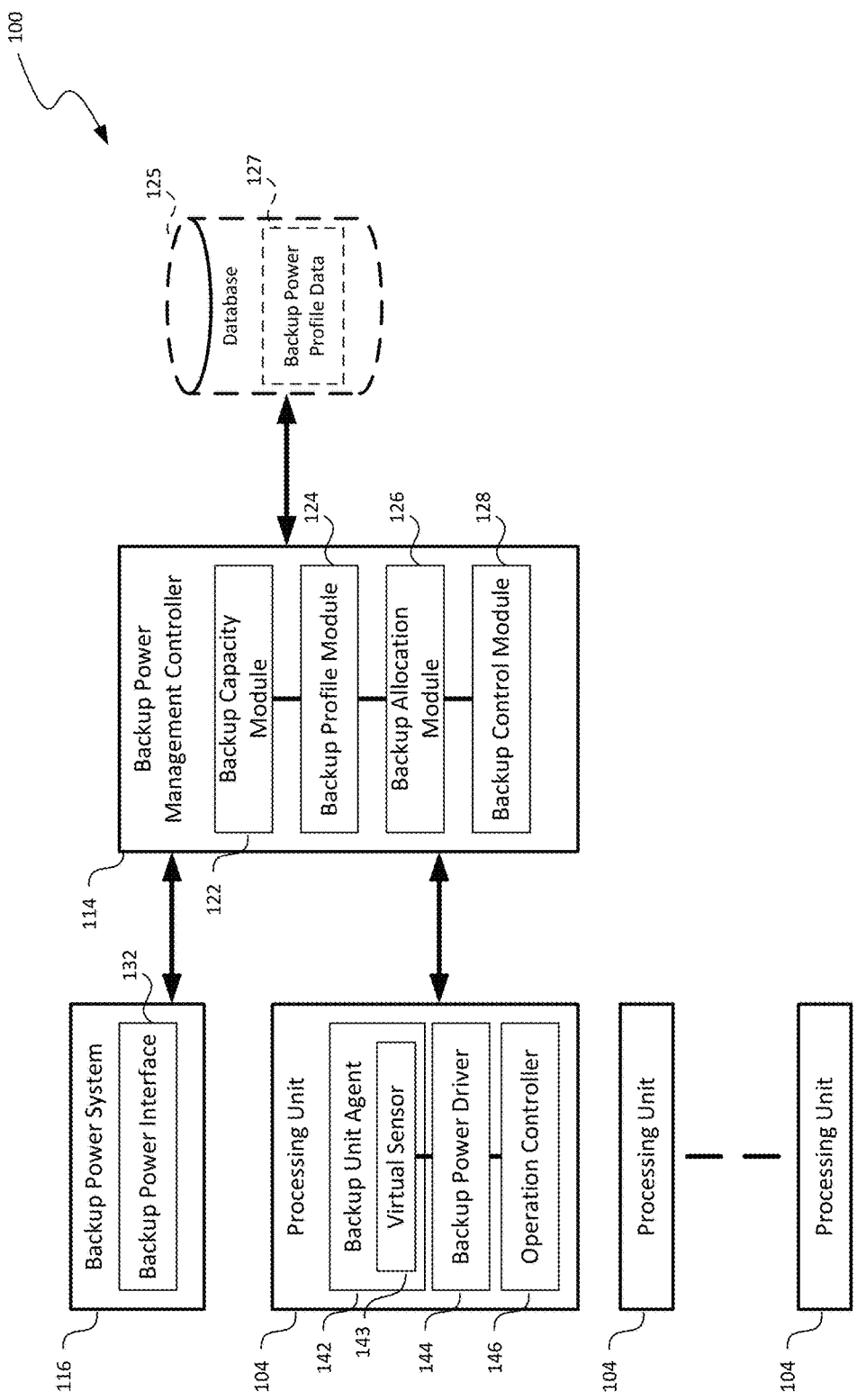
FIG. 1B is a block diagram showing software modules of certain components of the computing framework of FIG. 1A in accordance with embodiments of the present technology.

FIG. 1B is a block diagram showing software modules of certain components of the computing framework 100 in FIG. 1A in accordance with embodiments of the present technology. As shown in FIG. 1B, the backup power management controller 114 is operatively coupled to the backup power system 116, the processing unit 104, and an optional database 125 (shown in phantom lines for clarity). The optional database 125 may reside locally, for example, in one of the processing units 104 shown in FIG. 1A, or may reside remotely and be accessible via a network (e.g., the network 108). Only one processing unit 104 and associated software modules are shown in details in FIG. 1B for clarity purposes. Additional processing units 104 may include similar or different software modules as those illustrated in FIG. 1B.

In FIG. 1B and in other Figures herein, individual software modules, components, and routines may be a computer program, procedure, or process written as source code in C, C++, Java, and/or other suitable programming languages. The computer programs, procedures, or processes may be compiled into intermediate, object or machine code and presented for execution by a processor of a personal computer, a network server, a laptop computer, a smart phone, a tablet, and/or other suitable computing devices. Various implementations of the source, intermediate, and/or object code and associated data may be stored in one or more computer readable storage media that include read-only memory, random-access memory, magnetic disk storage media, optical storage media, flash memory devices, and/or other suitable media. As used herein, the term "computer readable storage medium" excludes propagated signals, per se.

As shown in FIG. 1B, the backup power management controller 114 is in communication with the processing units 104 and the backup power system 116 to monitor and/or control operations thereof. In the illustrated embodiment, the backup power management controller 114 includes a backup capacity module 122, a backup profile module 124, a backup allocation module 126, and a backup control module 128 operatively coupled to one another.

The backup power system 116 includes a backup power interface 132 configured to facilitate communications between the individual backup power units 117 (FIG. 1A) and the backup power management controller 114. In one embodiment, the backup power interface 132 may be configured to facilitate communications for a group of or all of the backup power units 117. In other embodiments, the backup power interface 132 may represent a collection of backup power interfaces (not shown) each corresponding to one of the backup power units 117.

The individual processing units 104 include a backup unit agent 142 having a virtual sensor 143, a backup power driver 144, and an operation controller 146 operatively coupled to one another. The foregoing software modules may be a part of an operating system, a standalone application, an add-in to an application, or a combination thereof. In other embodiments, the foregoing components of the processing units 104 may include input/output, database, or other additional and/or different types of software modules. The functions and interoperation of the software modules illustrated in FIG. 1B are described in more detail below.

The backup capacity module 122 can be configured to determine or estimate the backup capacity of the backup power system 116. In certain embodiments, the backup capacity module 122 can be configured to directly query the backup capacity from the backup power system 116, for example, via the backup power interface 132 following the power management bus ("PMBus") protocol or other suitable types of protocol. In other embodiments, the backup capacity module 122 may include facilities that measure, test, interrogate, and/or otherwise obtain individual backup capacities of the backup power units 117. For example, the backup capacity module 122 may include facilities that test (e.g., by a voltage of) each of the uninterrupted power supplies 118 (FIG. 1A) or the generator 120 (FIG. 1A) and estimate the individual backup capacities based on calibration data, formulas, lookup table, and/or other suitable information. The backup capacity module 122 may then combine the individual backup capacities to derive the overall backup capacity.

In certain embodiments, the backup capacity module 122 may also be configured to monitor for an addition, a modification, a removal, or other changes in the configuration and/or status of one or more of the backup power units 117 (FIG. 1A). For example, the backup capacity module 122 can be configured to periodically scan for a count, type, and/or status of the backup power units 117 and compare the scanning results to previous records. In other embodiments, the backup power system 116 may report any such changes to the backup capacity module 122 periodically or when a change occurs. In response to a detected change, the backup power management controller 114 may re-assign portions of the backup capacity to the individual processing units 104 and/or perform other suitable actions, as discussed in more detail below.

The backup profile module 124 can be configured to query and/or otherwise obtain data representing the backup power profiles from the processing units 104 sharing the backup power system 116. For example, in certain embodiments, the backup profile module 124 can identify at least one of a type, a class, a model, a serial number, a priority level, or other characteristics of the processing unit 104 by querying the backup unit agent 142. The backup profile module 124 can then derive a backup power profile based the identified characteristics of the processing unit 104 and the corresponding backup power profile data 127 in the optional database 125. For example, the backup power management controller 114 may identify the processing unit 104 as a server of a particular type (e.g., a web server). Based on such information, the backup profile module 124 may search the database for a corresponding record of the backup power profile data 127 and determine that the processing unit 104 has a particular peak power consumption level, a backup energy requirement, or other suitable backup power characteristics. In other embodiments, the backup profile module 124 may obtain such backup power characteristics directly from the backup unit agent 142 of the processing units 104 via, for example, an intelligent platform management interface ("IPMI") and/or other suitable types of interface.

The backup allocation module 126 can be configured to assign a portion of the backup capacity received from the backup capacity module 122 to the individual processing units 104 based on the backup power profiles received from the backup profile module 124. For example, in one embodiment, a first portion may be assigned to a processing unit 104 that is a server with a higher backup power rating than a second portion assigned to another processing unit 104 that is a router or network switch. In another example, the first portion may have a higher backup energy rating than the second portion, In a further example, the second portion may have a longer backup period than the first portion.

In certain embodiments, the backup allocation module 126 can be configured to assign an equal portion of the backup capacity to a particular type or class of processing units 104. For example, all processing units 104 that are servers can be assigned the same amount of the backup capacity. In other embodiments, the backup allocation module 126 can be configured to assign different amounts of backup capacity to a particular type or class of processing units 104 based on priority levels, implemented applications, latency requirements, current operating status, and/or other suitable parameters. For example, a larger portion of backup capacity may be assigned to a processing unit 104 that is a server hosting a search engine than another that is implementing data backup/restore.

In certain embodiments, the backup allocation module 126 can be configured to assign 100% of the backup capacity to the processing units 104, for example, by iteratively calculating an amount of backup capacity for each processing unit 104 until a sum of all the assigned portions is 100% of the backup capacity. In other embodiments, the backup allocation module 126 can be configured to assign a pre-determined amount of backup capacity to each type of the individual processing units 104 (e.g., servers). In further embodiments, the backup allocation module 126 can be configured to assign a pre-determined or calculated amount of backup capacity to the processing units 104 while maintaining a target level (e.g., 10%) of reserve backup capacity. In yet further embodiments, the backup allocation module 126 can be configured to assign more than 100% of the backup capacity (e.g., based on a load factor, a utilization factor or other suitable factors) or assign the backup capacity in any other suitable manners.

In further embodiments, the backup allocation module 126 can be configured to continuously or periodically monitor for a change in at least one of (1) the backup capacity received from the backup capacity module 122 or (2) the power backup profiles received from the backup profile module 124. In response to a detected change, the backup allocation module 126 can be configured to update the assigned portions of the backup capacity. For example, the backup allocation module 126 may detect that:

One or more backup power units 117 are added to or removed from the backup power system 116;
One or more processing units 104 are added to or removed from respective computer cabinets 102; and/or
One or more of the processing units 104 have a different type, class, model, serial number, priority level, or other characteristics.

In response, the backup allocation module 126 may adjust the portions of the backup capacity assigned to the processing units 104, respectively, as follows:

Increasing (or decreasing) portions of the backup capacity based on a new backup capacity as a result of the addition (or removal) of backup power units 117;
Re-distribute the backup capacity to the processing units 104 currently residing in the computer cabinets 102; and/or
Re-assigning a portion of the backup capacity to the one or more processing units 104 with the different characteristics.

The backup allocation module 126 can also be configured to communicate the assigned portions of the backup capacity to the individual processing units 104 via the network 108, a backplane bus (not shown), and/or other suitable communication channels. The individual processing units 104 may then detect and/or recognize the assigned portions of the backup capacity as if the processing units 104 are each connected to a "virtual" backup power unit with the assigned portion of the backup capacity. For example, in certain embodiments, the virtual sensor 143 may include a designated memory space (e.g., a register) configured to receive and store data representing the assigned portions of the backup capacity. The backup power driver 144 may then retrieve the written data from the virtual sensor 143 via local procedure call ("LPC") interface and/or other suitable interfaces. The backup power driver 144 can then supply data representing the backup capacity of the "virtual" backup power unit to the operation controller 146 for adjusting or optimizing operations of the individual processing units 104 according to user/application-level policies related to the backup capacity. In other embodiments, data representing the assigned portions of the backup capacity may be communicated to the processing units 104 as electronic messages and/or other suitable mechanisms.

During a failure of the main power source 107, the backup control module 128 may control the amount of power supplied to the processing units 104 from the backup power system 116 based on the portions of the backup capacity assigned to the processing units 104. For example, the backup control module 128 may limit a peak power, a backup energy consumption, a backup period, and/or otherwise regulate the power provided to the processing units 104 by manipulating the utility interfaces 106 (FIG. 1A) or other suitable power control circuits. As power is drawn from the backup power system 116, the backup power management controller 114 may continuously or periodically update a remaining amount of the assigned portions of the backup capacity to the processing units 104.

Based on the assigned and/or remaining portion of the backup capacity, the operation controller 146 of the individual processing units 104 can adjust at least one operating characteristics in the event that the main power source 107 is unavailable. For example, the operation controller 146 may adjust a clock frequency of a processor of a processing unit 104 when a remaining portion of the backup capacity is below a threshold. In another example, a processing unit 104 may adjust a status of acceptable task assignments (e.g., to "not available to accept further assignments") to the processing unit 104 when the remaining portion of the backup capacity is below another threshold. In further examples, the operation controller 146 may also initiate a shutdown sequence, commit cached data to the memory, or power off the processing units when the remaining portion of the backup capacity is below respective thresholds. As a result, the processing units 104 may be configured to customize operations to improve computing performance and/or power efficiencies over conventional computing systems.

Optionally, in certain embodiments, the individual processing units 104 can be configured to further assign a fraction of the portion of the backup capacity to components or sub-components of the processing units 104. For example, a processing unit 104 may assign a fraction of the backup capacity of the "virtual" backup power unit to a processor, a memory, a persistent storage device (e.g., solid state drives and non-volatile dual in-line memory modules), and/or other suitable components. As a result, the processor, memory, or persistent storage device may not require a built-in backup power source, and thus reducing equipment costs.

In certain embodiments, the operation controller 146 of a processing unit 104 may send a request to the backup power management controller 114 for an adjustment of the assigned portion of the backup capacity either during normal operation or in the event that the main power source 107 is unavailable. For example, in one embodiment, a processing unit 104 may contain data representing a user-selected and/or otherwise determined backup capacity requirement. The operation controller 146 can then determine if the assign portion of the backup capacity is above the backup capacity requirement. In response to determining that the assigned portion is below the backup capacity requirement, the processing unit 104 may send a request to the backup power management controller 114 for an adjustment. The backup power management controller 114 may then assign an adjusted portion of the backup capacity to the requesting processing unit 104.

In another example, during a failure of the main power source 107, the operation controller 146 may determine that the remaining portion of the backup capacity is insufficient to complete certain tasks (e.g., committing cached data to persistent memory, performing normal shutdown procedure, etc.). In response, the operation controller 146 may request an additional assigned portion of the backup capacity. The backup power management controller 114 may then assign additional backup capacity to the processing unit 104 by, for example, adjusting portions of the backup capacity assigned to other processing units 104 or assigning at least part of the backup capacity reserve. Alternatively, the backup power management controller 114 may refuse the request, and in response, the operation controller 146 may initiate an immediate shutdown and/or perform other suitable operations. In yet another alternative, the backup power management controller 114 may cause the tasks of the requesting processing unit 104 to be transferred to another processing unit 114 with a sufficient amount of an assigned portion of the backup capacity, for example, via load migration, virtual machine migration, or other suitable techniques.

Figure 2:
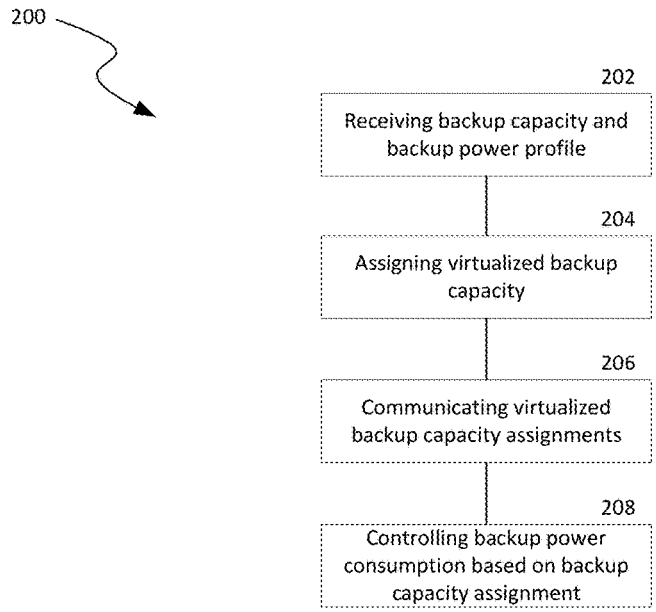
FIG. 2 is a flow diagram illustrating a process of backup power management in accordance with embodiments of the present technology.

FIG. 2 is a flow diagram illustrating a process 200 of backup power management in accordance with embodiments of the present technology. Even though the process 200 is described below with reference to the computing framework 100 of FIG. 1A and the components/modules of FIG. 1B, the process 200 may also be applied in other systems with additional or different hardware and/or software components.

As shown in FIG. 2, the process 200 can include receiving a backup capacity of a backup power system having one or more backup power units and one or more backup power profiles from one or more processing units that share the backup power system at stage 202. In one embodiment, the backup capacity may be directly queried from the backup power system. In another embodiment, the backup capacity may be derived by (1) querying, testing, or measuring individual backup power units for an individual backup capacity; and (2) combining the individual backup capacities into an overall backup capacity.

The process 200 can also include assigning a portion of the backup capacity of the backup power system as virtualized backup capacity to the individual processing units at stage 204, as described above with reference to FIG. 1B. As a result, the processing units can operate as if being individually connected to a "virtual" backup power unit that has the virtualized backup capacity (i.e., the assigned portion of the backup capacity). The assigned virtualized backup capacity can then be communicated to the processing units at stage 206. The individual processing units can then perform various operational optimization based on a status of the "virtual" backup power unit, as described in more detail below with reference to FIG. 3.

The process 200 also includes controlling a backup power consumption of the individual processing units based on a corresponding assigned portion of the backup capacity at stage 208. Example techniques for controlling the backup power consumption are described above with reference to FIG. 1B. As a result, in the event that a main power source to the processing units fails, the processing units can continue to operate by drawing power from the corresponding "virtual" backup power unit.

Figure 3:
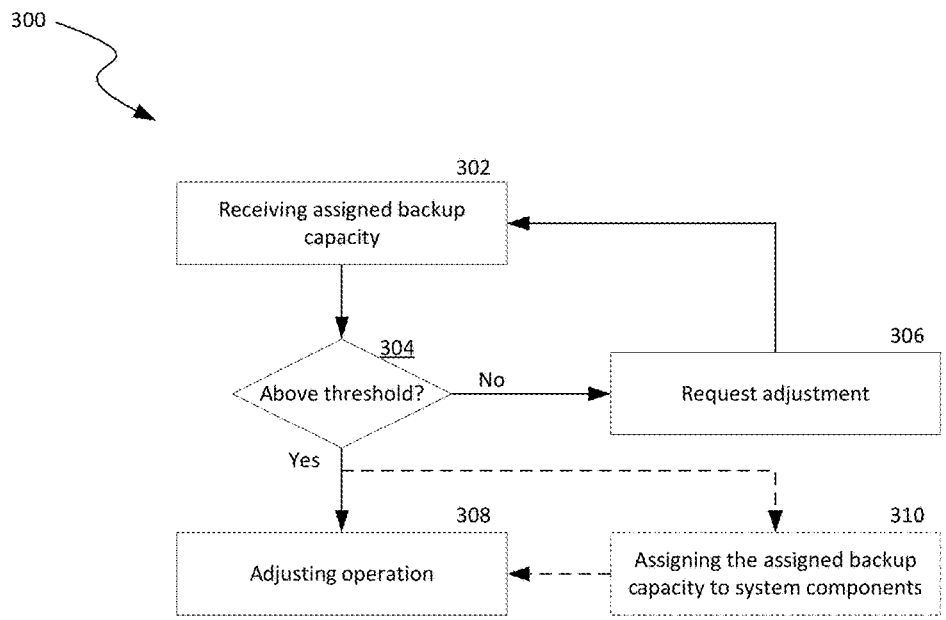
FIG. 3 is a flow diagram illustrating embodiments of a process of operating a processing unit based on an assigned backup capacity in accordance with embodiments of the present technology.

FIG. 3 is a flow diagram illustrating embodiments of a process 300 of operating a processing unit based on an assigned backup capacity in accordance with embodiments of the present technology. As shown in FIG. 3, the process 300 can include receiving data representing an assigned backup capacity at stage 302. The assigned backup capacity can be a portion of a total backup capacity of a backup power system that includes one or more backup power units shared by a plurality of processing units. In one embodiment, the assigned backup capacity may be received as a "virtual" sensor reading, as described above with reference to FIG. 1B. In other embodiments, the assigned backup capacity may be received as electronic messages and/or in other suitable manners.

The process 300 can also include a decision stage 304 to determine if the assigned backup capacity is above a threshold. In response to determining that the assigned backup capacity is above the threshold, the process 300 continues to adjusting operation of the processing unit based on the assigned backup capacity at stage 308. Examples of adjustments are described above with reference to FIG. 1B. Optionally, in certain embodiments, the process 300 can also include further assigning a fraction of the assigned backup capacity to components or subcomponents of the processing units 104 at stage 310. In other embodiments, the operation at stage 310 may be omitted. In response to determining that the assigned backup capacity is not above the threshold, the process 300 proceeds to requesting an adjustment of the assigned backup capacity at stage 306. The process 300 then reverts to receiving an assigned backpack capacity at stage 302.

Figure 4:
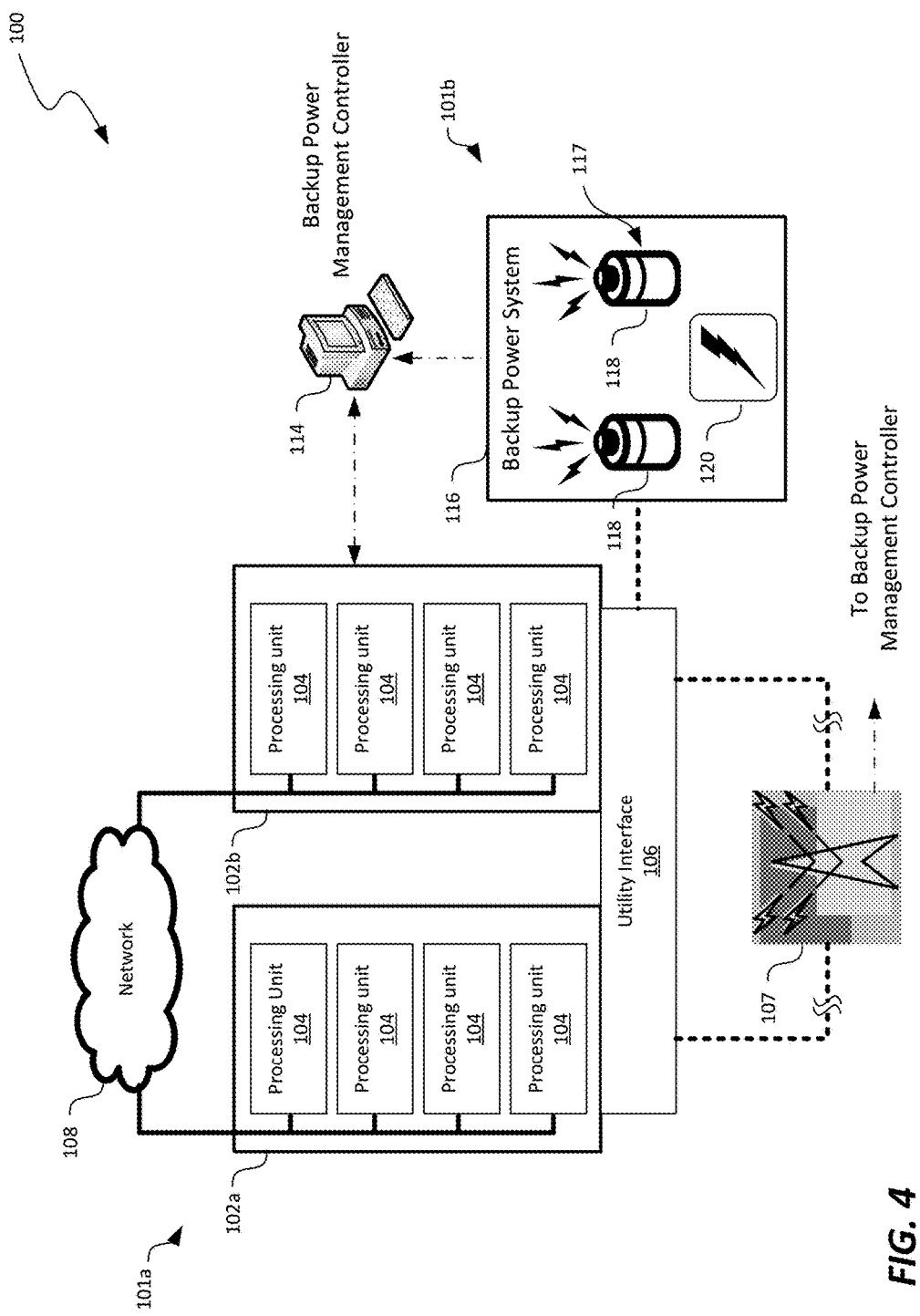
FIG. 4 is a schematic block diagram illustrating a computing system having a backup power management controller in accordance with additional embodiments of the present technology.

FIG. 4 is a schematic block diagram illustrating another computing framework 100 in accordance with embodiments of the present technology. The computing framework 100 in FIG. 4 can be generally similar in structure and function as that in FIG. 1A except that a single utility interface 106 is associated with both the first and second computer cabinet 102a and 102b. Even though not shown in FIG. 4, the utility infrastructure 101 b may have other suitable configurations.

FIG. 5 is a computing device 500 suitable for certain components of the computing framework 100 in FIG. 1A. For example, the computing device 500 may be suitable for the individual processing units 104, the backup power management controller 114, or the backup power systems 116. In a very basic configuration 502, computing device 500 typically includes one or more processors 504 and a system memory 506. A memory bus 508 may be used for communicating between processor 504 and system memory 506.

Depending on the desired configuration, the processor 504 may be of any type including but not limited to a microprocessor (μP), a microcontroller (μC), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 (or the operating system 520) may include, for example, the operation controller 146. This described basic configuration 502 is illustrated in FIG. 5 by those components within the inner dashed line.

The computing device 500 may have additional features or functionality, and additional interfaces to facilitate communications between basic configuration 502 and any other devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500. The term "computer storage medium" excludes propagated signals and communication media.

The computing device 500 may also include an interface bus 540 for facilitating communication from various interface devices (e.g., output devices 542, peripheral interfaces 544, and communication devices 546) to the basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A computing device sharing one or more backup power units with additional one or more computing devices interconnected by a computer network, the one or more backup power units having a total backup capacity, the computing device comprising:
a processor; and
a memory and one or more storage devices operatively coupled to the processor, the memory containing instructions executable by the processor to cause the processor to perform a process comprising:
receiving, via the computer network, data indicating a value of backup capacity allocated from the total backup capacity to the computing device, the allocated value of backup capacity being a portion of the total backup capacity of the one or more backup power units; and
in response to the received data,
assigning a portion of the allocated value of backup capacity individually to the processor, the memory, and to each of the one or more storage devices; and
when the computing device experiencing a power outage, initiating a shutdown procedure in response to the power outage;
determining whether the assigned portions of the allocated value of backup capacity to the processor, the memory, and to each of the one or more storage devices are sufficient to complete the initiated shutdown procedure; and
in response to determining that at least one of the assigned portions of the allocated amount of backup capacity is not sufficient to complete the initiated shutdown procedure, requesting an additional amount of backup capacity to be allocated to the computing device.

2. The computing device of claim 1 wherein receiving the data includes receiving the data indicating at least one of a backup power rating or a backup energy rating of the portion of the total backup capacity of the one or more backup power units allocated to the computing device.

3. The computing device of claim 1 wherein the process performed by the processor further includes:
receiving additional data indicating a remaining value of the backup capacity allocated to the computing device;
based on the received additional data:
adjusting at least one of a clock frequency of the processor or a status of acceptable task assignment to the computing device; or
initiating an immediate shutdown sequence for the computing device.

4. The computing device of claim 1 wherein the process performed by the processor further includes receiving additional data indicating a remaining value of the backup capacity allocated to the computing device and based on the received additional data, committing cached data to the memory or one of the storage devices.

5. The computing device of claim 4 wherein the one or more storage devices include one or more solid state drives and/or non-volatile dual in-line memory modules that do not include built-in backup power source.

6. The computing device of claim 4 wherein committing cached data includes initiating a data write to copy data from the memory to at least one of the one or more storage devices.

7. The computing device of claim 4 wherein:
the allocated value of backup capacity is a first backup capacity;
the process performed by the processor further includes:
determining whether the allocated first backup capacity is above a backup threshold;
in response to determining that the first backup capacity is not above the backup threshold, transmitting a request, via the computer network, to adjust the first backup capacity; and
in response to the transmitted request, receiving a second allocated value of backup capacity different than the first backup capacity.

8. The computing device of claim 7 wherein the process performed by the processor further includes adjusting at least one assigned portions of the value of backup capacity individually to the processor, the memory, and to each of the one or more storage devices.

9. A method performed by a server interconnected with other servers by a computer network in a computing system, the servers all sharing a backup power unit having a total backup capacity for the computing system, wherein the method comprising:
receiving, via the computer network, data indicating an amount of backup capacity allocated to the server, the amount of backup capacity representing a portion of the total backup capacity of the backup power unit that the server is allowed to consumed when the server experiencing a power outage;
in response to the received data,
assigning a fraction of the allocated amount of backup capacity to a processor of the server; and
during a power outage experienced by the server,
committing cached data from the memory to a persistent storage device in response to the power outage at the server;
determining whether the assigned fraction of the allocated amount of backup capacity is sufficient to complete committing the cached data; and
in response to determining that the assigned fraction of the allocated amount of backup capacity is not sufficient to complete committing cached data, requesting an additional amount of backup capacity to be allocated to the computing device.

10. The method of claim 9 wherein the processor of the server does not include a built-in backup power source.

11. The method of claim 9, further comprising based on a remaining portion of allocated amount of backup capacity, adjusting at least one of a clock frequency of the processor or a status of acceptable task assignment to the computing device or initiating a shutdown sequence for the computing device.

12. The method of claim 9, further comprising based on a remaining portion of allocated amount of backup capacity, committing cached data to the memory or the storage device.

13. The method of claim 9 wherein the storage device includes one or more solid state drives and/or non-volatile dual in-line memory modules that do not include built-in backup power source.

14. The method of claim 9, further comprising based on a remaining portion of allocated amount of backup capacity, initiating a data write to copy data from the memory to the storage device.

15. The method of claim 9, further comprising adjusting the assigned fractions of the allocated amount of backup capacity to the processor.

16. A computing device sharing one or more backup power units with additional one or more computing devices interconnected by a computer network, the one or more backup power units having a total backup capacity, the computing device comprising:
a processor; and
a memory operatively coupled to the processor, the memory containing instructions executable by the processor to cause the processor to perform a process comprising:
receiving, via the computer network, data indicating an amount of backup capacity allocated from the total backup capacity to the computing device, the allocated amount of backup capacity being a portion of the total backup capacity of the one or more backup power units;
in response to the received data, assigning a fraction of the allocated amount of backup capacity to the processor; and
during a power outage at the computer device,
initiating a shutdown procedure in response to the power outage at the computing device;
determining whether the assigned fraction of the allocated amount of backup capacity is sufficient to complete the initiated shutdown procedure; and in response to determining that the assigned fraction of the allocated amount of backup capacity is not sufficient to complete the initiated shutdown procedure, requesting an additional amount of backup capacity to be allocated to the computing device.

17. The computing device of claim 16 wherein the process performed by the processor further includes:
limiting usage of the allocated amount of backup capacity from the backup power unit by the processor to the assigned fraction of the allocated amount of backup capacity associated with the processor during the initiated shutdown procedure.

18. The computing device of claim 16 wherein the process performed by the processor further includes:
committing cached data from the memory to a persistent storage device in response to a main power failure at the computing device;
determining whether the assigned fraction of the allocated amount of backup capacity is sufficient to complete committing the cached data; and
in response to determining that the assigned fraction of the allocated amount of backup capacity is not sufficient to complete committing cached data, requesting an additional amount of backup capacity to be allocated to the computing device.

19. The computing device of claim 16 wherein the process performed by the processor further includes:
in response to receiving a refusal for additional amount of backup capacity, initiating an immediate shutdown of the computing device.

20. The computing device of claim 16 wherein the process performed by the processor further includes based on the received data indicating the amount of backup capacity allocated to the computing device, performing at least one of adjusting at least one of a clock frequency of the processor or a status of acceptable task assignment to the computing device, initiating a shutdown sequence for the computing device, powering off the computing device, or committing cached data to the memory.

* * * * *